United States Patent [19]

Howden, Jr.

[11] Patent Number: 5,086,912
[45] Date of Patent: Feb. 11, 1992

[54] AMBULATOR FOR CARPET ROLLS OR THE LIKE

[76] Inventor: Dwight E. Howden, Jr., 2029 Brookview Dr., Dalton, Ga. 30720

[21] Appl. No.: 614,073

[22] Filed: Nov. 13, 1990

[51] Int. Cl.⁵ .............................................. B65G 25/02
[52] U.S. Cl. ..................... 198/776; 198/774.3
[58] Field of Search ............... 198/774.1, 774.3, 774.4, 198/775, 776; 414/525.9

[56] References Cited

U.S. PATENT DOCUMENTS

| | | | |
|---|---|---|---|
| 793,926 | 7/1905 | Edwards | 198/775 X |
| 807,564 | 12/1905 | Lorillard | 198/776 X |
| 816,323 | 3/1906 | Hellstrom | 198/775 X |
| 863,841 | 8/1907 | George | 198/774.3 |
| 1,139,027 | 5/1915 | George | 198/774.3 X |
| 1,905,461 | 4/1933 | Gassen | 198/774.1 X |
| 1,939,426 | 12/1933 | Wilcox et al. | 198/774.1 X |
| 1,942,538 | 1/1934 | Cutler | 198/774.3 X |
| 2,664,990 | 1/1954 | Georgiev et al. | 198/775 X |
| 3,892,337 | 7/1975 | Neumann | 198/776 X |
| 3,971,716 | 7/1976 | Foreman | 209/396 |
| 4,321,995 | 3/1982 | Dell et al. | 198/459 |
| 4,624,614 | 11/1986 | Levad et al. | 198/774.3 X |
| 4,853,116 | 8/1989 | Wallander | 198/776 X |

FOREIGN PATENT DOCUMENTS 2086335 5/1982 United Kingdom .

OTHER PUBLICATIONS

6 Photos of Playful Penguin Toy (on 2 sheets).

Primary Examiner—Joseph E. Valenza
Assistant Examiner—Cheryl L. Gastineau
Attorney, Agent, or Firm—Alan Ruderman

[57] ABSTRACT

An ambulator for conveying rolls of carpet from a first elevation to a second elevation in a continuous stepwise manner has a fixed frame including a pair of spaced apart inclined frame members having a multiplicity of steps extending thereon from the first elevation to the second elevation, and a movable frame having spaced apart inclined beam members having a similar multiplicity of steps thereon. The profile of the steps on the fixed frame and on the movable frame are identical, and the movable frame is driven in an orbital path raising and lowering while moving longitudinally relative to the fixed frame. As the movable frame orbits it lifts a roll of carpet extending across a first set of steps of the fixed frame and carries it to a second set of steps closer to the second elevation. As the movable frame continues to orbit back to its initial position a second set of steps on the movable frame lifts and carries the carpet from the second set of fixed steps to the next set of steps and continuously in seriatim until the roll is at the second level. The beam members of the movable frame have downwardly extending arms which are journally connected to respective rotatable levers driven from a common source. Depending upon the direction of rotation of the levers the ambulator may raise a roll from a lower elevation to an upper elevation or lower a roll from an upper elevation to a lower elevation.

6 Claims, 4 Drawing Sheets

AMBULATOR FOR CARPET ROLLS OR THE LIKE

BACKGROUND OF THE INVENTION

This invention relates to the transfer of an elongated substantially cylindrical body such as a roll of carpet or the like from one vertical level laterally to a second vertical level, and more particularly to a method and apparatus for conveying a roll of carpet in an inclined path between two stations in a continuous manner.

In a carpet mill, rolls of carpet during various operations are transferred from one location in the mill to another. For example, after a length of carpet is wound about a core and covered by a wrapping, it is transported to a distribution station where it is stored or shipped. In the past, the transportation of the rolls between the various stations was performed by lifting and carrying the rolls by fork lifts or similar manually movable means More recently, especially in at least the larger mills, in order to reduce the production costs, minimize the number of necessary fork lifts, and the required time for transporting the rolls of carpet, the trend has been to utilize conveyor systems.

However, because conveyors normally require a substantial amount of floor space and impede the movement of personnel and equipment, such as fork lifts utilized for other operations, the conveyor systems comprise a series of conveyors, one of which being inclined for carrying the rolls from a first conveyor or other apparatus on the mill floor to an elevated conveyor spaced above the floor for transfer to other elevated conveyors. The area below the elevated conveyors may thus be utilized for the other operations. However, since a roll of carpet would roll down an inclined conveyor if transferred with its axis extending transverse to the direction of conveyance, the inclined conveyors are constructed so that the axis of elongation of each roll is aligned with the direction in which the rolls are transported. Thus, for example, when a roll of carpet is to be transferred between two spaced apart substantially parallel conveyors, a roll placed upon the inclined conveyor must be rotated at the upper elevation by a pivotable conveyor receiving the roll from the inclined conveyor and transferred to a first elevated conveyor extending substantially 90 degrees to the inclined conveyor and generally to the destination conveyor. Moreover, the roll must again be rotated 90 degrees to be received onto such destination conveyor. Accordingly, in this example, a pivotable conveyor is required not only between the inclined conveyor and the adjacent elevated conveyor, but between the two elevated conveyors.

The deficiencies of such a system is that each time the pivotable conveyors are operated, the line must be stopped to permit the pivotable conveyors to rotate from their initial roll receiving positions to their discharge positions, and then back again to the initial position. The cycle time for this maneuver generally is in the order of approximately 45 seconds, and when considering the number of carpet rolls produced daily in the large carpet mills, this comprises a considerable waste of time. Other examples of the deficiencies of the utilization of inclined conveyors result in an ineffective utilization of the space between the initial conveying station and the final conveying station. Accordingly, not only do the inclined conveying systems require a substantial amount of space for certain conveying operations, but they are also functionally inefficient when the axis of the roll must be rotated due to the parameters created by the inclined conveyors i.e., the axis of the roll must extend in the same direction that the roll is being conveyed.

SUMMARY OF THE INVENTION

Consequently, it is a primary object of the present invention to provide a conveyor and a method for transporting substantially cylindrical bodies, such as rolls of carpet or the like from one elevation to another in a continuous manner, the axis of the rolls being transverse to the direction of the conveyance.

It is another object of the present invention to provide a conveyor and a method for transporting rolls of carpet from a first elevation to a second elevation in a continuous stepwise manner, the rolls being received by the conveyor at the first elevation and discharged at the second elevation.

It is a further object of the present invention to provide a method and apparatus for conveying a roll of carpet by lifting and lowering the roll in a continuous step-wise manner in seriatim between a first elevation and a second elevation, the roll being lifted and lowered by an orbiting staircase from and onto a fixed staircase.

Accordingly, the present invention provides a method and apparatus for conveying a substantially cylindrical body such as a roll of carpet in a continuous step-wise manner from one elevation to another, either moving the body upwardly or downwardly, i.e., the first level may be the lower level or the upper level. The apparatus includes a pair of spaced apart inclined fixed frame members having a multiplicity of tooth-like members extending along the length of each frame member, the tooth-like members in one frame member being aligned with those in the other frame member, and a pair of spaced apart inclined movable beam members intermediate the frame members and also having a multiplicity of tooth-like members extending along the length of each beam member with the tooth-like members of one beam member aligned with the tooth-like members of the other beam member, the profile and number of tooth-like members on the frame members being substantially identical to the tooth-like members on the beam members. Preferably the tooth-like members are in the form of steps.

The movable beam members are driven, preferably in a rising and lowering orbiting path while moving longitudinally relative to the fixed frame members so that the steps of the movable beam members are aligned with one set of steps on the frame member at one point in the cycle and with a second set of steps on the fixed frame members at another point in the cycle. Thus, a roll of carpet or other substantially elongated cylindrical body disposed transversely across a first set of steps on the fixed frame members is lifted by a first set of steps on the movable frame members and deposited onto the second set of steps on the fixed frame members during the cycle. The steps on the movable beam members thereafter cycle beneath the second set of fixed steps and lift up the roll to repeat the cycle until the roll is at the second elevation.

In the specific form of the invention arms are fixed at one end to the movable beam members and at the other end are journally connected to rotating lever means to orbit the movable beams relative to the fixed frame members. The rotating lever means may be driven in one of two directions selectively to orbit the movable beam members in an upward path to raise the rolls of carpet, or in a downward path to lower the rolls of carpet. Additionally, the profile of the stairs is such that a roll of carpet cannot roll off the stairs due to gravity, the stairs having an obtuse angle at the intersection of the riser and the adjacent treads.

By means of the present invention, a roll of carpet or the like may be moved through a carpet mill or the like without having to change the direction at which the axis is disposed as is required with the inclined conveyors of the prior art. Thus, since the wasted cycle time of rotating pivotable conveyors is avoided, the conveyance of carpet rolls or other substantially elongated cylindrical bodies through the mill may be more rapid and, depending on the conveyor arrangement with which the apparatus of the present invention is used, the required space for conveyance of such bodies through the mill may be reduced.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
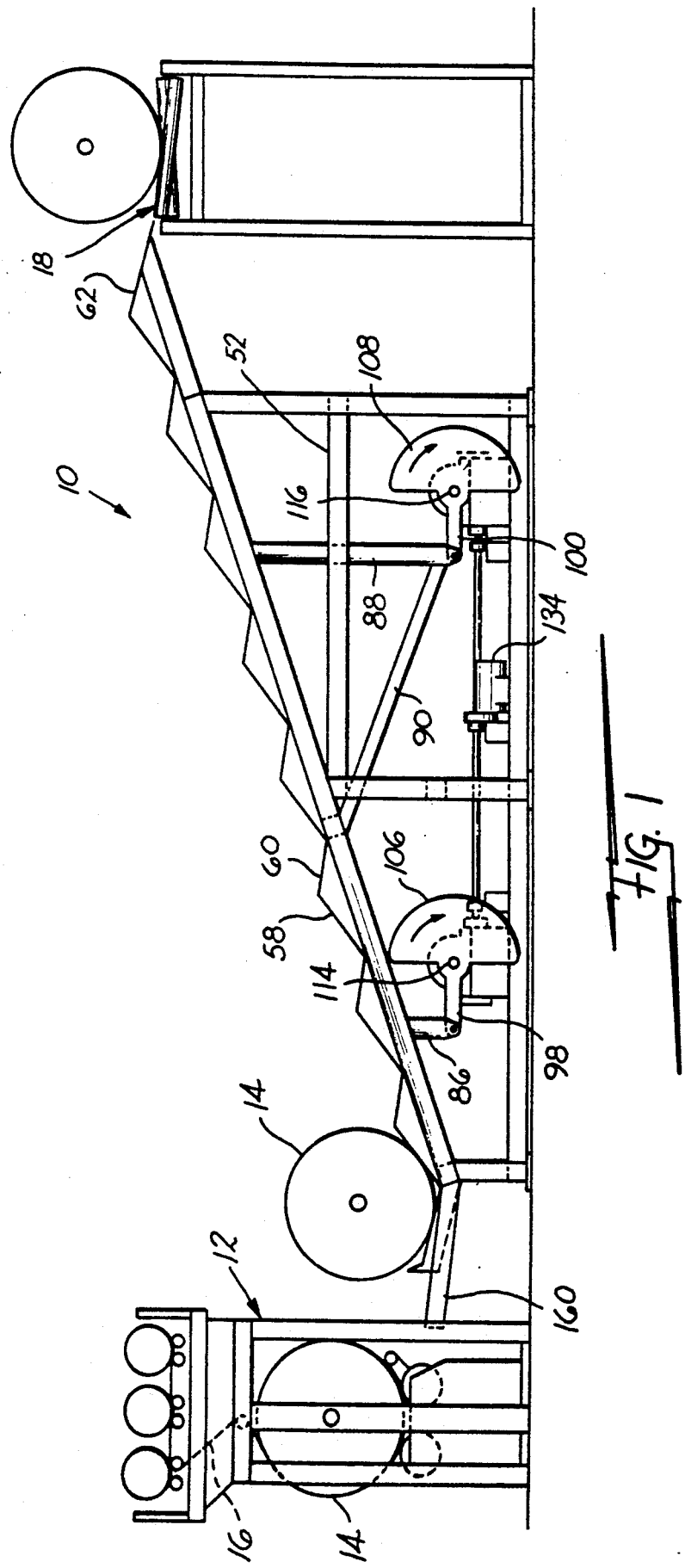
FIG. 1 is an elevational view of a carpet roll conveyor or ambulator constructed in accordance with the principles of the present invention and illustrating the members during one portion of the cycle when the fixed and movable stairs are aligned.
Figure 2:
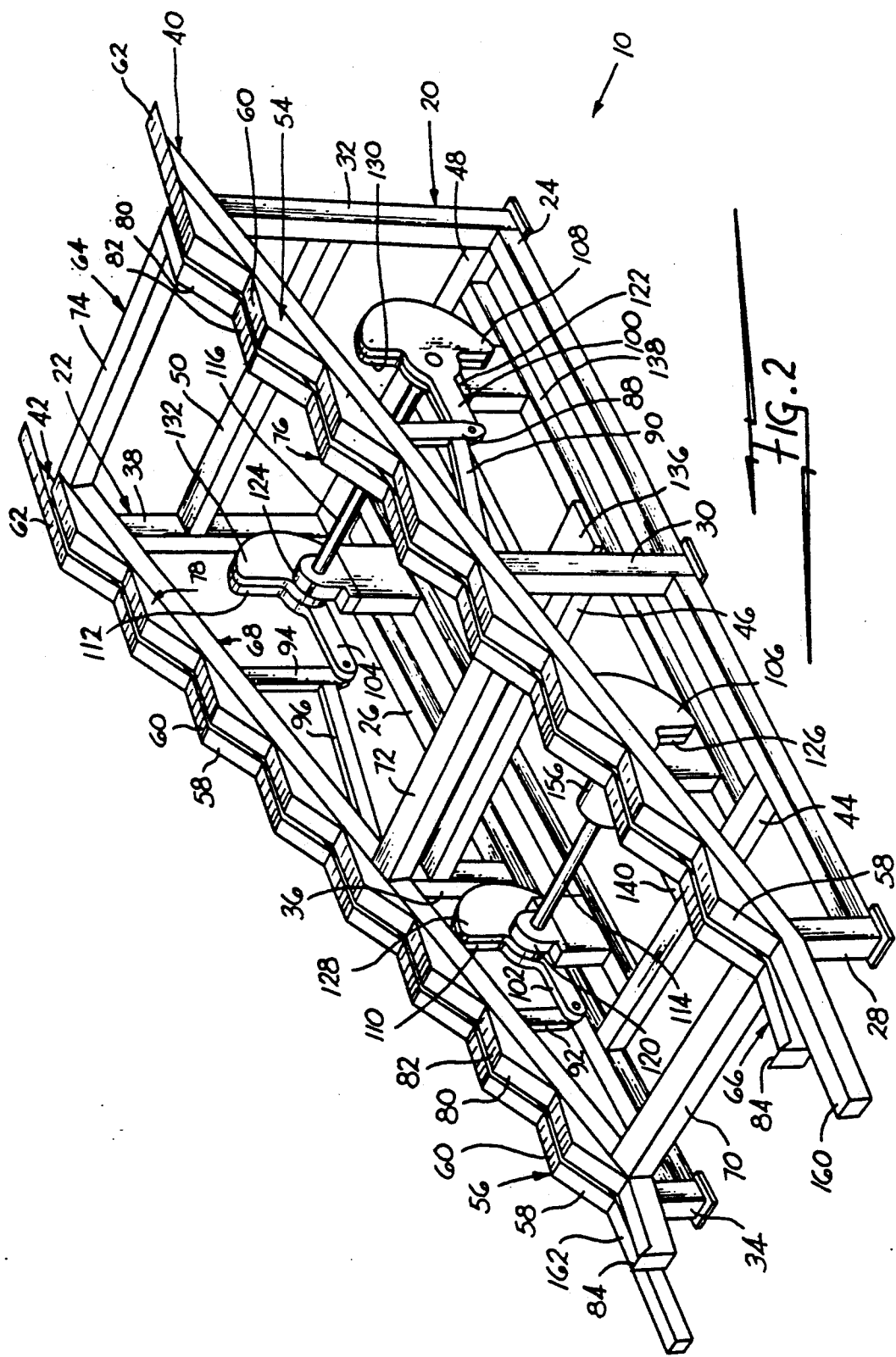
FIG. 2 is a perspective view of the ambulator illustrated in FIG. 1.
Figure 3:
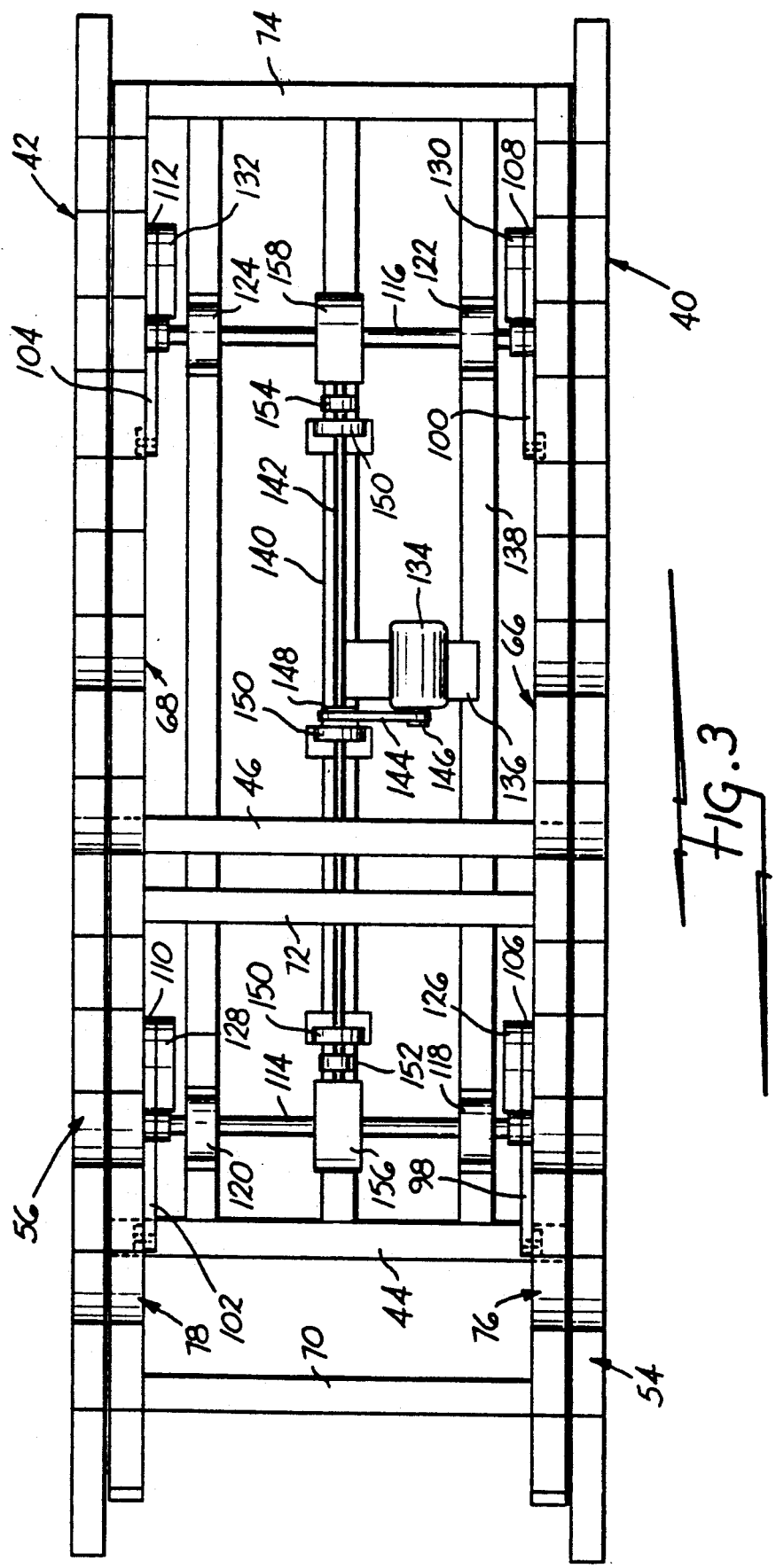
FIG. 3 is a top plan view thereof.

Referring now to the drawings, for purposes of description, the invention will be described in conjunction with a carpet roll ambulator, but it should be understood that other elongated substantially cylindrical bodies may also be moved by the apparatus and method of the present invention. Such an ambulator constructed in accordance with the principles of the present invention is generally illustrated at 10 in FIG. 1 intermediate roll wrapping apparatus 12, wherein a roll of carpet 14 wound about a core (not illustrated) is wrapped with a plastic covering film 16, and a conveyor 18 wherein another roll of carpet is illustrated in a disposition for conveyance to another station in a carpet mill. The ambulator 10, as best illustrated in FIGS. 2 and 3, comprises a fixed frame having a pair of substantially identical fixed frame assemblies 20, 22, each frame assembly having a base in the form of a longitudinally extending beam 24, 26, disposed on the floor of the mill or on feet. Fixed to each beam 24, 26 are vertically extending posts 28, 30, 32 and 34, 36, 38 respectively, the post 28, 34 being the same height but shorter than the post 30, 36 which are also the same height, while the post 32, 38 are the same height but are taller than the post 30, 36.

Fixedly disposed on the tops of the posts are respective frame members 40, 42, the frame members thus being angularly inclined relative to the floor. A plurality of transversely extending beams, such as illustrated at 44, 46, 48 and 50 interconnect the frame assemblies 20, 22 together to provide rigidity to the structure. Other strengthening members such as struts 52, illustrated in FIG. 1, but omitted for clarity of presentation in FIG. 2, connect the post 30 and 32 together, while a similar strut (not illustrated) may connect the post 36 and 38 together. Thus, a rigid and structurally integral fixed frame is provided for supporting spaced apart inclined frame members 40, 42.

Figure 5:
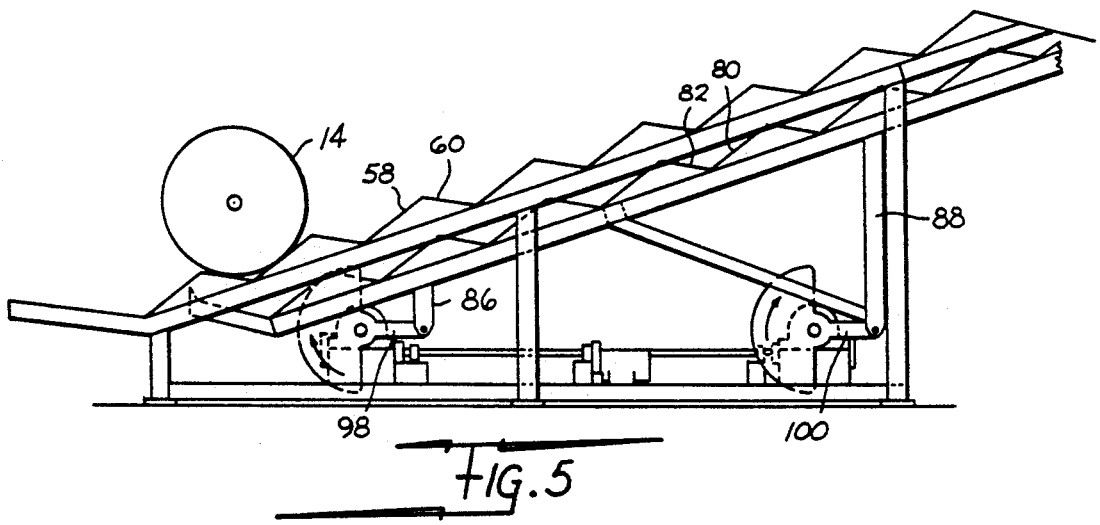
Figure 6:
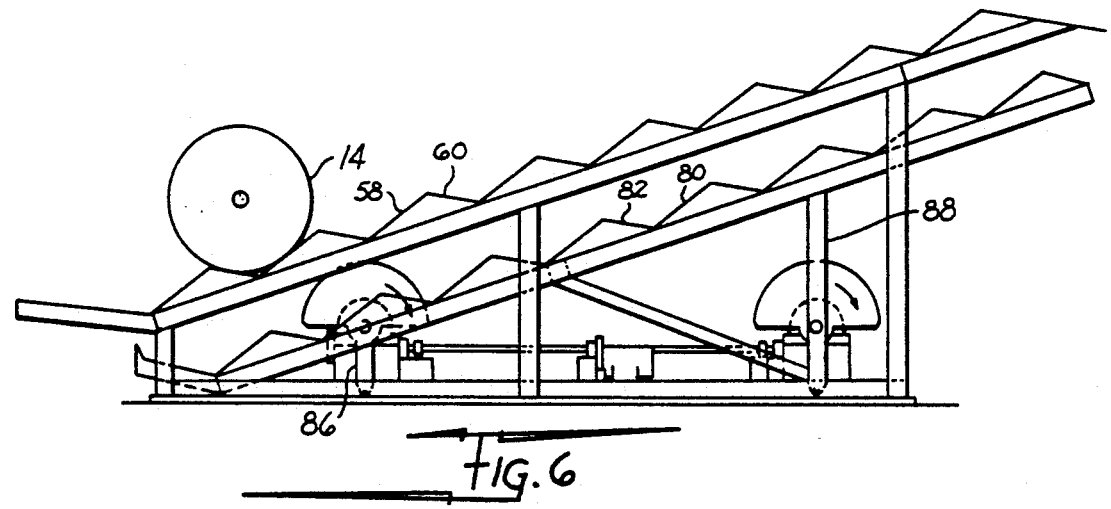

Fixedly secured to the upper surface of each frame member 40, 42, such as by welding or the like, is a multiplicity of undulating tooth-like members preferably in the form of respective steps 54, 56, each step 54 being aligned with a respective step 56. The steps 54 and 56 have an identical profile of risers 58 and treads 60, but the most upper tread 62 is elongated relative to the treads 60 for the application illustrated so as to overlay the adjacent edge of the conveyor 18. As illustrated, the treads 60 and 62 are angularly inclined relative to the base members 24, 26 and thus to the floor in a downward direction from the juncture with the corresponding riser and toward the next adjacent riser so that a roll of carpet disposed on the tread will not roll down the steps, but will be cradled in the crotch between the tread and the adjacent upper riser as illustrated in FIGS. 5 and 6. Additionally, the angular disposition between the risers and the treads provides obtuse angles between the riser and the tread of each step, and between the tread of one step and the riser of the adjacent step, the obtuse angle between the adjacent steps providing a crotch for cradling the rolls of carpet to prevent it from rolling downwardly due to gravity.

Disposed between the frame assemblies 20 and 22 is a movable frame assembly 64 comprising spaced apart beam members 66, 68 interconnected by transversely extending beams 70, 72, 74. Fixedly secured to the upper surface of each beam member 66, 68 is a multiplicity of steps 76, 78, each step 76, 78 having an identical profile of risers 80 and treads 82, and each step 76 being aligned with a respective step 78. Additionally, the profile of each step 76, 78 is identical to the steps 54, 56 of the fixed frame assemblies 20, 22, i.e., the risers 58 and 80, and the treads 60 and 82 have identical profiles as illustrated in FIGS. 1 and 2. An uplifted lip 84 is disposed at the leading edge of the lowermost tread 78 so that a roll of carpet positioned thereon will not roll off. Fixedly secured to the underside of the beam member 66 are a pair of spaced apart downwardly depending arms 86, 88, a bracing arm 90 being secured at one end to the arm 88 and at its other end to the underside of the beam member 66 intermediate the arms 86 and 88. Similarly, downwardly depending arms 92 and 94, and a bracing arm 96, are secured to the underside of the beam member 68.

In order to support and drive the movable beam assembly 64, the arms 86, 88, 92 and 94 preferably are journally connected to the end of a respective rotatable drive arm 98, 100, 102, 104, the drive arms 98, 100, 102, 104 being integral with substantially semi-circular flywheel/counter-balancing members 106, 108, 110, 112 so that the drive arms effectively form cranks. The members 106 and 110 are fastened to a first transversely extending shaft 114, while the members 108 and 112 are fastened to a second transversely extending shaft 116, each shaft 114, 116 being rotatably journalled in bearings 118, 120 and 122, 124 respectively. The length and disposition of the arms 86, 88, 92, 94 and the drive arms 98, 100, 102, 104 are such that in one position, i.e., the initial position prior to commencing the transfer cycle, as illustrated in FIG. 1, the steps 76, 78 of the movable frame are aligned with the steps 54, 56 of the fixed frame. Preferably, in this position the downwardly depending arms 86, 88, 92 and 94 are vertically oriented and the drive arms 98, 100, 102, 104 are horizontally oriented. Additional counter-balancing weights 126, 128 and 130, 132 preferably are disposed on the respective shafts 114 and 116 to provide a smooth low vibration orbiting of the movable frame as it is driven relative to the shafts 114, 116.

In order to drive the shafts 114 and 116, and thereby drive the movable frame in an orbiting path, a drive motor 134 is fastened on a support plate 136 intermediate the movable frame beam members 66, 68, the plate 136 being secured to beams 138, 140 which are respectively welded to at least the transverse beams 44, 48 of the fixed frame. The motor 134 is spaced from a longitudinally extending drive shaft 142 located substantially centrally between each pair of movable beam members 66, 68, and a drive belt 144 is trained about pulleys 146, 148 respectively fastened to the output shaft of the motor and the drive shaft 142. The longitudinally extending drive shaft 142 is rotatably journalled in bearings 150 and has respective ends connected by couplings 152, 154 to the input shaft of respective gear boxes 156, 158, the outputs of the gear boxes being connected to the respective transversely extending shafts 114, 116, which of course, may each comprise a pair of shafts. Thus, when the motor 134 is driven, the shafts 114, 116, and the respective drive arms 98, 100, 102, 104 are rotated to orbitally drive the movable frame 64. The motor is a conventional reversible type motor which may rotate in either direction selectively depending upon the polarity of the current applied to its field, and thus the movable frame may be orbited to move a roll of carpet either up the steps, or down the steps, the selection being dependent upon the application of the ambulator.

Figure 4:
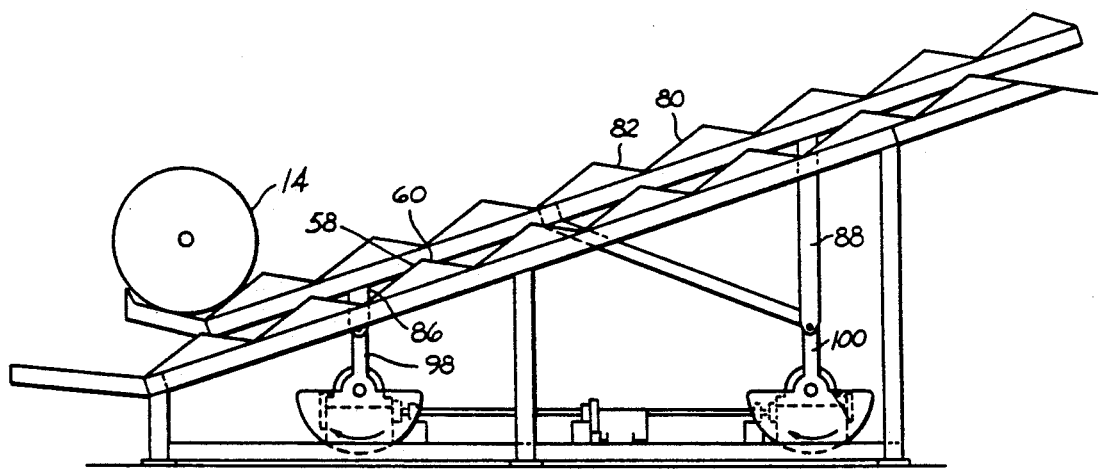
FIGS. 4 through 6 are views similar to FIG. 1 illustrating the various disposition of the movable stairs during different phases of the orbiting cycle.

In operation, assuming a roll of carpet 14 is to be moved up the steps from the wrapping apparatus 12 to the conveyor 18, the roll is deposited onto extended leading ends 160, 162 of the fixed frame members, forward of and inclined downwardly toward the first of the steps 54, 56 respectively, and enters the disposition of the respective crotch between the leading ends and the risers of the respective first steps. As the movable frame is orbited, the treads 82 of the first steps 76, 78 of the movable beams orbit beneath the roll as illustrated in FIG. 1 and as the movable frame continues in its path, the roll is lifted cradled between the first treads and risers 82, 80 respectively while precluded from rolling off by the lips 84 and, as illustrated in FIG. 4, further movement of the movable frame not only lifts the roll 14 but moves it rearwardly in the direction toward the conveyor 18. As the movable frame continues in its path, it thereafter moves further rearwardly and commences a downward movement until the first steps on the movable frame are substantially aligned with the second set of steps on the fixed frame, and as it subsequently moves below the steps on the fixed frame, the roll 14 is deposited on the second steps of the fixed frame as illustrated in FIG. 5. Further orbiting of the movable frame brings it substantially below the fixed frame and forwardly of its discharge position as illustrated in FIG. 6. As the movable frame continues its orbital path, it again rises to receive the roll of carpet 14 on its second set of steps, while another roll of carpet may be deposited on its first set of steps. The cycle, which is continuous, thereafter repeats as the movable frame deposits the roll 14 onto the third set of steps of the fixed frame and thereafter onto subsequent steps in seriatim until the roll reaches the upper treads 62 and rolls onto the conveyor 18. If a roll is to be moved downwardly, the rotation of the motor 134 is reversed to reverse the path of the movable frame so as to deposit a roll of carpet received at the top of the fixed frame in seriatim onto each subsequent lower pair of steps of the fixed frame until the roll is at the bottom.

Accordingly, the present invention provides a method and apparatus for moving an elongated substantially cylindrical body such as a roll of carpet from one elevation to a second elevation in a continuous manner, the axis of the body being transverse to the direction in which the body is being moved. Therefore, the invention gives greater flexibility to the carpet manufacturing process, and to other processes wherein an elongated substantially cylindrical body is moved from one elevation to another, and particularly that portion of the carpet manufacturing process wherein a completed roll is conveyed for further distribution.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method for conveying a substantially cylindrical roll of carpet having an axis about which the roll is elongated from a receiving station at a first elevation to a discharge station at a second elevation, said method comprising:

(a) disposing said roll on a first pair of spaced apart fixed steps at said first elevation of a respective pair of laterally spaced apart fixed frame members having a multiplicity of fixed steps undulating from said first elevation to said second elevation, said roll being disposed with said axis extending laterally;

(b) disposing a movable frame having a multiplicity of pairs of laterally spaced apart movable steps intermediate said fixed frame members;

(c) entering beneath said roll while supported on said first pair of spaced apart fixed steps with a pair of spaced apart movable steps of said movable frame;

(d) lifting said movable frame to engage and cradle said roll by said pair of spaced apart movable steps and thereafter lifting said roll by said pair of spaced apart movable steps;

(e) moving said movable frame in a direction extending from said first elevation toward said second elevation such that said pair of movable steps are disposed vertically above a second pair of spaced apart fixed steps closer to said second elevation; and (f) lowering said movable frame to dispose said pair of movable steps vertically beneath said second pair of fixed steps while depositing said roll on said second pair of spaced apart fixed steps, said method including continuously driving said movable frame and all said movable steps in an orbital path to move said roll at substantially the same speed in seriatim from said first elevation to said second elevation.

2. In the method as recited in claim 1, including subsequently entering beneath said roll and said second pair of fixed steps with another pair of movable steps and thereafter lifting said roll from said second pair of fixed steps, and continuing to move said movable frame to thereafter deposit said roll onto subsequent fixed steps in seriatim until said roll is at said second level.

3. Apparatus for conveying a substantially cylindrical body having an axis about which the body is elongated from a receiving station at a first elevation to a discharge station at a second elevation said apparatus comprising, a fixed frame having a pair of spaced apart fixed inclined frame members, each of said frame members having a multiplicity of steps including risers and treads adapted for receiving said body therebetween with said axis extending in a direction transverse to said frame members, the risers and treads of both frame members having the same profile, means for fixedly aligning the profile of the steps of one fixed frame member with the profile of the steps of the other fixed frame member, a movable frame having a pair of spaced apart movable beam members disposed intermediate said pair of fixed frame members, each of said movable beam member having a multiplicity of steps including risers and treads adapted for receiving said body therebetween, the risers and treads of both movable beam members having the same profile, the risers and treads of the movable beam members being substantially identical in profile to the risers and treads of the fixed frame members, said profile providing an obtuse angle between the risers and the treads of corresponding steps and between the risers and treads of adjacent steps, means for fixedly aligning the profile of the steps of one movable beam member with the profile of the steps of the other movable beam member, means for mounting and driving all of the steps of said movable frame at substantially the same speed in an orbital path relative to said fixed frame such that each pair of steps of said movable frame enters beneath a first corresponding pair of steps of said fixed frame to engage a substantially cylindrical body thereon and thereafter lift said body and carry it toward the next adjacent steps of said fixed frame member closer toward said second elevation and to thereafter lower and deposit the body on said next steps and to move subsequently to again enter beneath said first corresponding pair of steps, and said means for mounting and driving providing alignment of pairs of steps of said movable frame with said first corresponding pair of steps and with said next steps of said fixed frame during each orbital cycle, whereby a body deposited on said first pair of steps of said fixed frame member may be transferred gradually to said second elevation in stepwise fashion.

4. Apparatus as recited in claim 3, wherein said means for mounting and driving said movable frame includes arm means fixedly secured to each movable beam member, rotatable lever means journally connected to each arm means, and drive means for rotatably driving said lever means selectively in a first direction to raise said body from a lower elevation to an upper elevation and in a second direction to lower said body from an upper elevation to a lower elevation.

5. Apparatus as recited in claim 4, wherein said drive means is disposed intermediate said movable frame members.

6. A method for conveying a substantially cylindrical body having an axis about which the body is elongated from a receiving station at a first elevation to a discharge station at a second elevation, said method comprising:
   (a) disposing said body between a tread of a first pair of steps and a riser of an adjacent second pair of steps of a respective pair of laterally spaced apart fixed frame members having a multiplicity of fixed steps undulating from said first elevation to said second elevation, said body being disposed with said axis extending laterally;
   (b) disposing a movable frame having a multiplicity of laterally spaced apart movable steps having treads and risers intermediate said fixed frame members, said movable steps and said fixed steps having identical profiles;
   (c) entering beneath said body, said first pair of fixed steps and said second pair of fixed steps with a first pair of movable steps and a second pair of movable steps of said movable frame;
   (d) lifting said movable frame to align said movable steps vertically with said fixed steps to engage and cradle said body between the treads of said first pair of movable steps and the risers of said second pair of movable steps, and thereafter lifting said body from said fixed steps while so cradling and supporting said body between said first and second pairs of movable steps;
   (e) moving said movable frame in a direction extending from said first elevation toward said second elevation such that said first and second pairs of movable steps are respectively disposed vertically above said second pair of fixed steps and an adjacent third pair of fixed steps closer to said second elevation;
   (f) lowering said movable frame to align said first and second pairs of movable steps vertically respectively with said second and third pairs of fixed steps so that said body is disposed between the treads of said first pair of movable steps and the risers of said second pair of movable steps and between the treads of said second pair of fixed steps and the risers of said third pair of movable steps; and
   (g) thereafter lowering said movable frame further to release said body from said movable frame so that said body is supported only between the treads of said second pair of fixed steps and the risers of said third pair of movable steps.

* * * * *